June 22, 1926.  
A. P. STEINER  
1,589,440  
ADJUSTABLE BEARING FOR GRINDING WHEELS  
Filed May 13, 1925  
2 Sheets-Sheet 2
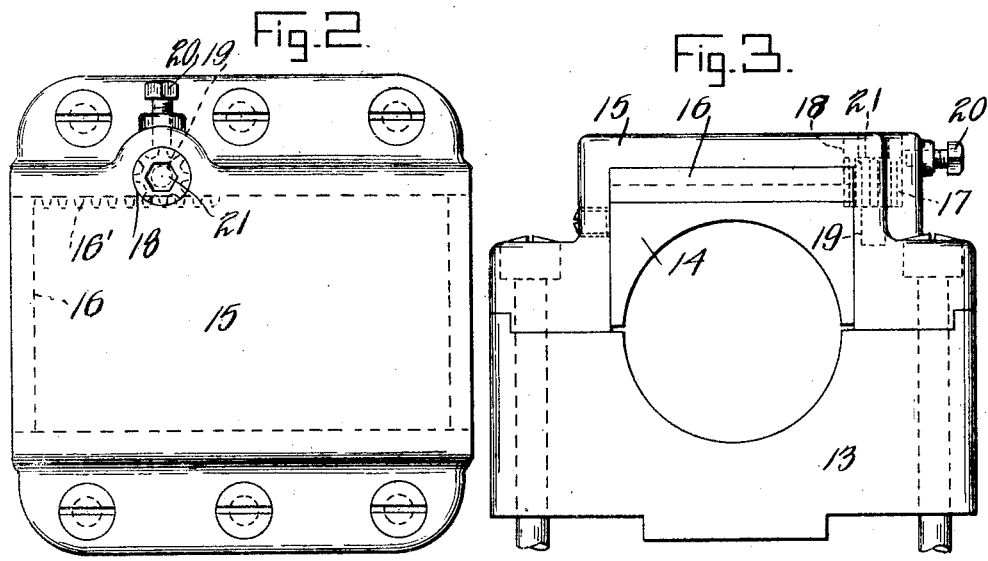
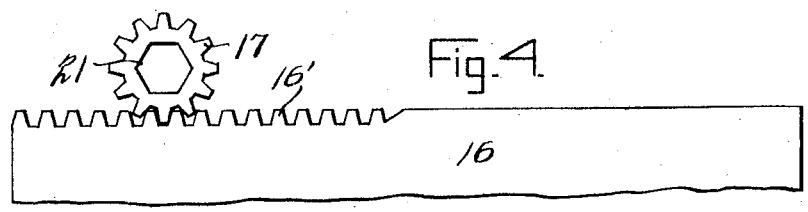
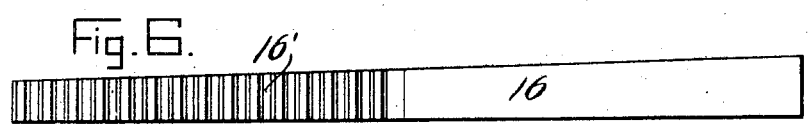
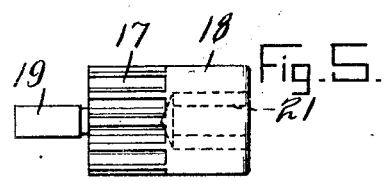
Inventor  
Amos P. Steiner
Attorney Patented June 22, 1926.

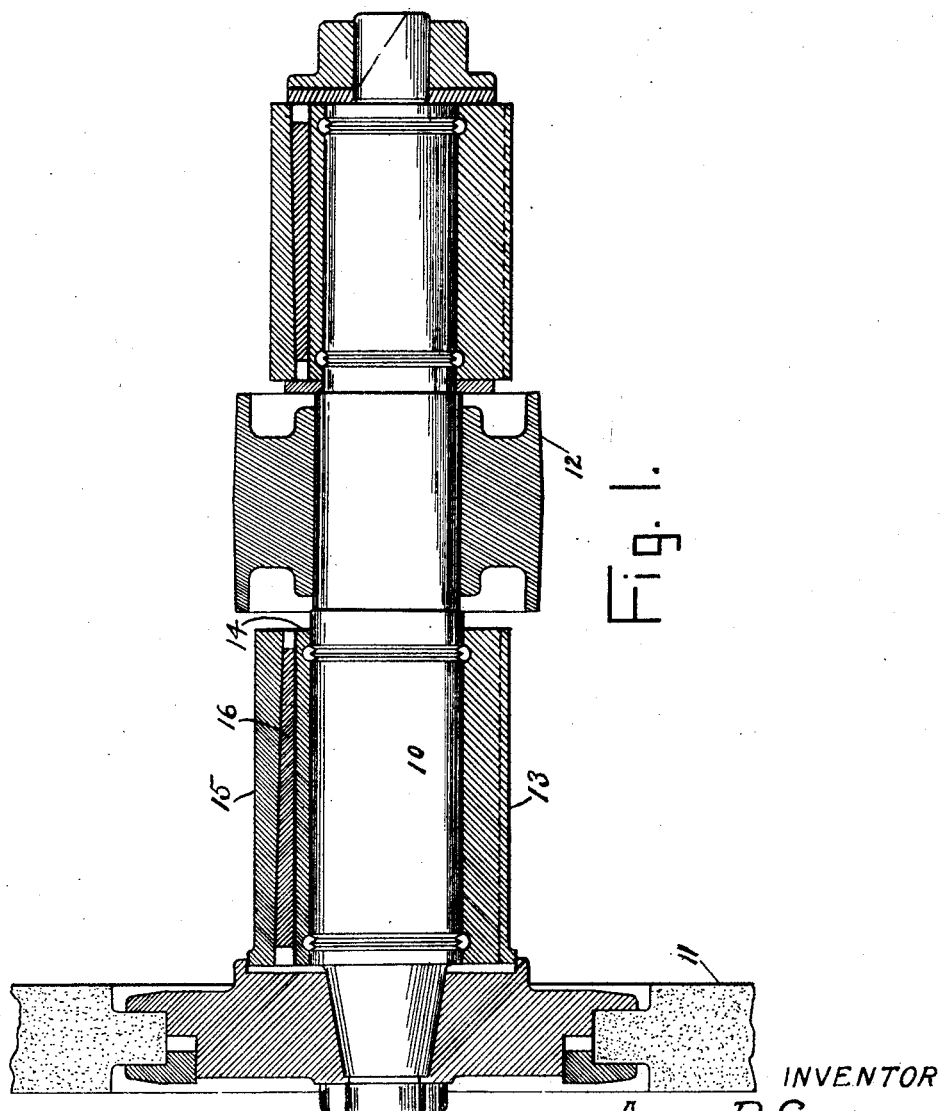

1,589,440

UNITED STATES PATENT OFFICE.

AMOS P. STEINER, OF WAYNESBORO, PENNSYLVANIA, ASSIGNOR TO LANDIS TOOL COMPANY, OF WAYNESBORO, PENNSYLVANIA, A CORPORATION OF PENNSYLVANIA.

ADJUSTABLE BEARING FOR GRINDING WHEELS.

Application filed May 13, 1925. Serial No. 30,058.

This invention relates to a bearing for a high speed spindle such as a wheel spindle for a grinding machine, where the bearing must fit very closely while the spindle is running to prevent vibration and chatter. A close fitting bearing generates heat and this causes expansion, which expansion must not be restricted or the spindle will seize and stick. The usual method of enclosing the bronze bearing inside of a solid cast iron housing is often the cause of trouble, as the expansion of bronze is greater than that of cast iron, therefore the expansion of the bronze is restricted in expanding outwardly by the cast iron housing and must therefore be forced in toward the spindle, which is also being expanded by the heat, with the result, that the spindle is seized by the bearing and probably ruined.

The principal object of this invention is to provide means whereby a wheel spindle bearing can be quickly and easily adjusted without stopping the spindle or disturbing or dismantling any part of the bearing.

A further object is to provide a removable cap over the bearing of a composition similar to the bearing itself in regard to expansion so that the bearing and cap will expand uniformly together.

Referring to the accompanying drawings which are made a part hereof and on which similar reference characters indicate similar parts:

Figure 1 is an assembly section showing the general arrangement,

Figure 2, a plan view of one of the bearings,

Figure 3, an end elevation of the same,

Figure 4, a detail elevation of the adjusting wedge and pinion,

Figure 5, a side elevation of the pinion, and

Figure 6, a plan of the adjusting wedge.

In the drawings, reference character 10 indicates a wheel spindle, carrying a grinding wheel 11 and driven by a pulley 12. A belt on a driving pulley below the pulley 12 drives pulley 12 and the spindle therefore the pull of the belt is downward and the grinding pressure is exerted against the lower bearing 13 which is securely bolted to the wheel base.

An upper bearing 14 rests on the wheel spindle and is held in position thereon by the housing 15. The bearing 14 is made of some suitable material for bearing purposes and usually of bronze and the composition of the cap or housing 15 is the same as that of the bearing, or if not then the housing is preferably made of material having approximately the same co-efficient of expansion as the bearing. The purpose of this, as above indicated is to cause the two parts to expand at substantially the same rate and thus prevent undue heating and seizing of the spindle.

The housing 15 is bolted to the lower bearing 13 and the inner surface of the housing is shown as being inclined away from the grinding wheel. A wedge 16 has a straight face corresponding to that of the bearing 14 and an inclined face cooperating with that of the housing 15, the wedge being slidably mounted between said parts and having means for adjusting it lengthwise of the spindle to position the bearing 14 correctly, so as to compensate for wear on the bearing.

The wedge is provided at one side with a series of teeth 16' forming a rack for engagement with teeth of a pinion 17 having a cylindrical head 18 journaled in the housing 15 and a reduced part 19 also journaled in a recess in the housing.

A set screw 20 mounted in the cap 15 is positioned to bear against the head 18 to lock the wedge in adjusted position. A recess is provided at 21 in the head of the pinion for engagement by a wrench or key and thus the pinion may be turned to adjust the position of the wedge and consequently of the bearing or brass, the set screw being first backed off to permit the pinion to turn freely.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A spindle bearing comprising a fixed bearing member, a loose bearing member, a cap secured to the fixed bearing member for holding the loose bearing member in place the material of the cap having a coefficient of expansion approximating that of the upper bearing, a wedge between the loose bearing member and the cap said wedge having an inclined surface cooperating with an inclined surface on one of the adjacent members, and means for adjusting the wedge to force the loose bearing toward the spindle, substantially as set forth.

2. A spindle bearing comprising a fixed bearing member, a loose bearing member, a cap of material similar to that of the loose bearing member secured to the fixed bearing member for holding the loose bearing member in place, a wedge between the loose bearing member and the cap said wedge having a surface extending lengthwise of the spindle cooperating with an inclined surface on one of said adjacent members to force the loose bearing member toward the shaft, and means for moving the wedge lengthwise of the spindle, substantially as set forth.

3. A spindle bearing comprising a fixed bearing member having a semi-cylindrical bearing surface, a loose bearing member having a semi-cylindrical bearing surface, a cap secured to the fixed bearing member for holding the loose bearing member in place, a wedge between the loose bearing and the cap said wedge having a surface extending lengthwise of the spindle cooperating with an inclined surface on one of said adjacent members, means for moving the wedge lengthwise of the spindle including a pinion rotatably mounted on the bearing, and teeth on the wedge engaging the teeth of the pinion, substantially as set forth.

4. In a spindle bearing, a fixed bearing member, a loose bearing member of different composition, and a housing rigidly secured to the fixed bearing member the rate of expansion of the housing being the same as that of the loose bearing member, substantially as set forth.

In witness whereof, I have hereunto set my hand at Waynesboro, Pennsylvania this 6th day of May, A. D. nineteen hundred and twenty-five.

AMOS P. STEINER.